March 14, 1967 C. H. EMERY, JR., ETAL 3,309,457

JOINT FOR COPPER-COATED SUPERCONDUCTIVE WIRES

Filed April 8, 1964

INVENTORS
CLARE H. EMERY, JR.
ROYAL C. MORTENSEN

BY Leo A. Plum, Jr.
ATTORNEY

United States Patent Office 3,309,457
Patented Mar. 14, 1967

3,309,457
JOINT FOR COPPER-COATED SUPERCONDUCTIVE WIRES

Clare H. Emery, Jr., Tonawanda, and Royal C. Mortensen, Buffalo, N.Y., assignors to Union Carbide Corporation, a corporation of New York Filed Apr. 8, 1964, Ser. No. 358,306
1 Claim. (Cl. 174—94)

This invention relates to a superconducting electrical joint for joining superconducting wires and to a method of forming such a joint.

A major advantage of the use of superconductors in electromagnets, is that the magnet can be operated in the "persistent mode." This means that no electrical power is required to maintain the magnetic field within the magnet, and that extremely stable and constant magnet fields can be achieved. In order to operate a magnet in the persistent mode, it is necessary that the entire current path through the windings, and through some external means of connecting one end of the windings with the other, be superconducting, i.e. have zero resistance. If some small resistance, R, is included in the current path, energy will be lost as joule heat at that point, and the magnet operation will not be truly persistent, but rather the magnetic field will decay with a time constant of $L/R$, where L is the inductance of the magnet.

It is therefore necessary to find some means of joining one superconducting wire to another having essentially zero resistance when the wires are in the superconducting state. By "essentially zero" resistance we mean $10^{-7}$ ohms or less. For resistances less than $10^{-7}$ ohms, the field decay in the average persistently operated magnet will be undetectable during a running time of many hours. It is of course necessary that the joint maintain its essentially zero resistance while passing the electric current required for operation of the magnet (usually determined by the supercurrent capacity of the wire) and while in the magnetic fields encountered in close proximity to the magnet.

We have discovered that such a "superconducting joint" can be made between wires of solid solution alloy superconductors by compressing under certain conditions of pressure and dimensions, the two wires to be joined in a contact made from essentially the same superconducting material as the wire. This technique results in a joint which has the same magnetic field and current characteristics as the wire itself, and is thus indistinguishable from a continuous piece of wire, except for its physical form.

A further major advantage of this type of joint is that it can be made very small. In present-day superconducting magnets there is frequently insufficient space for the use of larger-sized alternatives such as pressed copper contacts, which, moreover, are inferior electrically.

Figures 1, 2A, 3A, 3B:
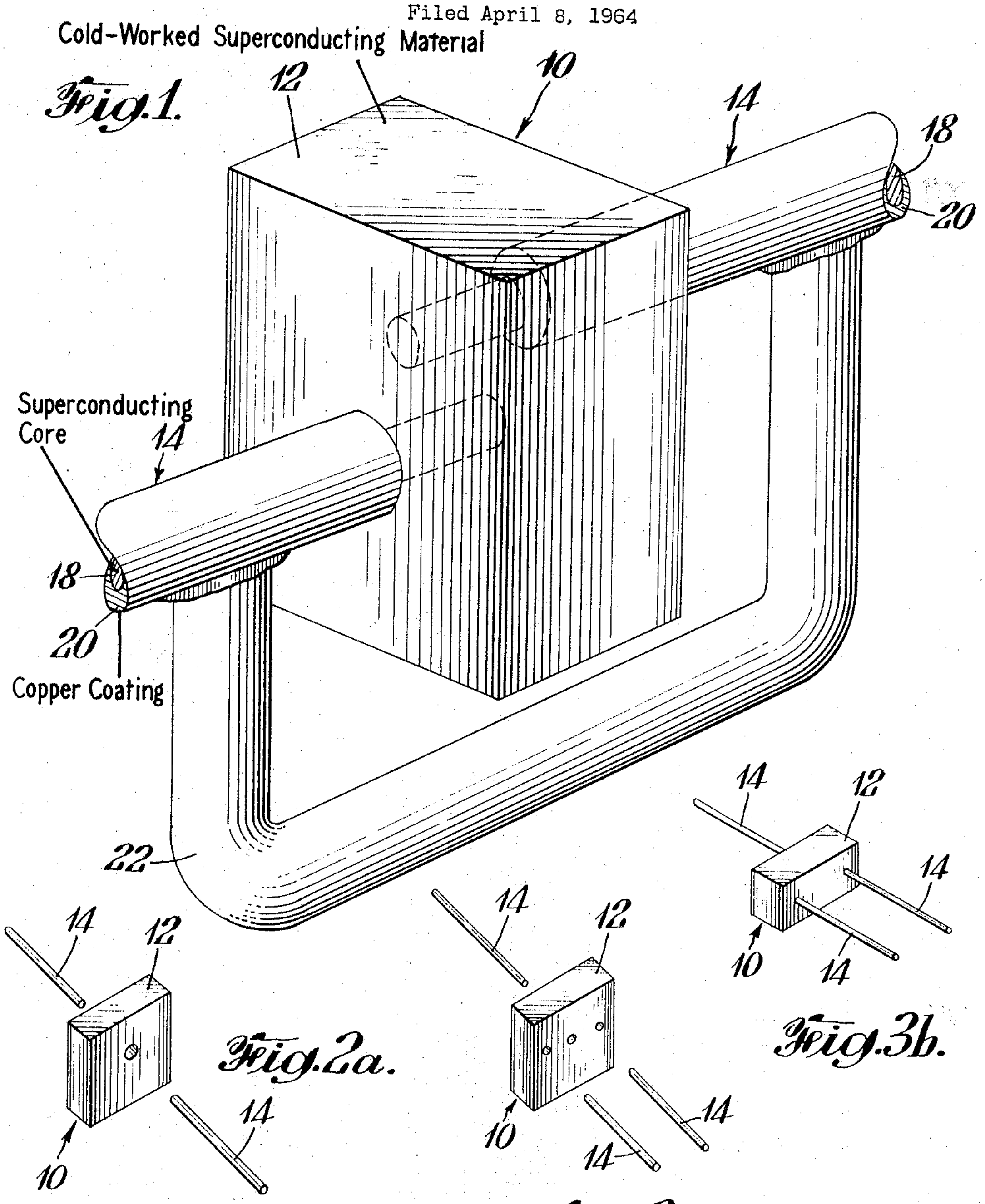

An object of this invention is to provide a superconducting joint between ends of superconducting wires. Another object is to provide such a joint which is essentially non-resistive and is therefore suitable for splicing the ends of superconducting wires used in the construction of superconducting magnets. A further object is to provide a method for making such joints. These and other objects and advantages of the present invention are further described in the following description and accompanying drawings of which:

FIGURE 1 is a perspective view of one embodiment of the present invention.

Figure 2B:
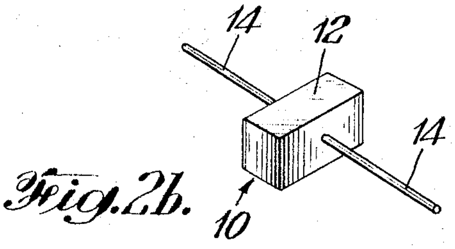

FIGURES 2*a* and 2*b* are perspective views of one embodiment of the present invention, before and after a splice between sections of a superconducting wire have been made.

FIGURES 3*a* and 3*b* are perspective views of another embodiment of the present invention, before and after a splice between sections of a superconducting wire have been made.

The superconducting joint 10 of the present invention comprises a contact member 12 of superconducting material which has at least one aperture therein, and ends 14 of superconducting wires to be spliced in superconducting electrical contact inserted into the aperture. The preferred manner of forming this joint is to drill a hole in the contact, insert the wire ends into the hole, and compress the contact to cold weld the wire ends within the interior of the contact 12. To insure a non-resistive joint the contact 12 and wire ends 14 should be cleaned of any foreign material. The joint formed in accordance with the present invention between the superconductive contact 12 and the wire ends is essentially a cold weld joint. It has been discovered that a substantial portion of the joint between the contact 12 and the wire ends should constitute a cold weld for the joint to be non-resistive.

Photomicrographs of non-resistive superconducting joints constructed in accordance with the present invention establish that there is no interface between the wires and the contact i.e. that there indeed exists a cold weld.

It has been found to be essential that the superconducting material of which the contact 12 is constructed be cold-worked prior to assembling the joint 10. Preferably, such material should be cold-worked by 90% or greater reduction.

The superconducting joint of the present invention is particularly useful for splicing ends of wire used in the construction of superconducting magnets. Such wire is a composite structure comprising a core 18 constructed of superconducting material and jacketed by an outer layer 20 of normally electrically conductive material such as copper. This type of wire is especially difficult to splice in a non-resistive superconductive manner. With the present invention, however, the pressed superconductive contact 12 is in intimate electrical contact with the superconductive wire cores and no current need pass resistively through the normally electrically conductive wire jackets.

When the superconducting joint of the present invention is used in the assembly of a superconducting magnet, it has been found important to connect a normally conductive shunt 22 around the contact 12. This shunt 22 is preferably constructed of the same material as the outer jacket 20 of the superconducting wires and may be connected to the outer jacket by any suitable means such as soldering. If a superconducting electrical circuit such as found in a persistent superconducting magnet is transformed from a superconducting state to a normally resistive state, energy would tend to concentrate at points in the circuit where there are no normally conducting elements and would probably destroy the superconducting material at those points. Consequently, it is necessary to use shunt 22 to provide a normally conductive circuit bypassing contact 12. All superconductive wires, having an outer jacket of copper or like normally conductive material, that are joined by contact 12 should be shunted around contact 12 as described above. This may be accomplished by a wire shunt as shown in FIGURE 1 or it may be accomplished by connecting the outer jackets of all such wires to a common strip of normally conductive material. The use of a strip shunt is preferred if contact 12 joins more than two superconducting wires because of convenience in making the shunt.

Tests have shown that the spliced wire ends need not be physically in contact with one another inasmuch as the superconductive electrical path is provided by the superconductive contact 12. This feature of the present invention is a marked improvement over other types of joints inasmuch as no special care need be taken to assure that the wires make contact with each other when inserting them into the superconductive contact 12. Thus, a separate hole could be drilled in the superconductive contact 12 for each of the wires to be spliced rather than only providing one hole. Any number of wires may be joined in one contact as shown by way of example in FIGURES 2*a* and 3*a*, 2*b* and 3*b*, which are, respectively, views before and after the joint is completed.

As an example of a joint constructed in accordance with the present invention a 0.030 inch hole was drilled through the center of a superconductive contact constructed of a niobium-zirconium alloy 3/16 inch on a side and 1/16 inch wide. Two niobium-25% zirconium copper-plated wires and the superconductive contact were cleaned by (1) degreasing with trichloroethylene, (2) washing with concentrated nitric acid, and (3) washing with water and drying with clean acetone. The copper plate on the wire ends was removed to expose the superconducting core. One wire was inserted into each end of the hole in the superconductive contact and the contact was then compressed to one-half its original height under a pressure sufficient to form a cold weld between the contact and the wires. The wire non-resistively carried a superconducting current of 30 amps in an external magnetic field of 10 kilogauss. The same wire when spliced as described above, also non-resistively carried 30 amps in an external field of 10 kilogauss. In another superconductive contact having dimensions as described above, an individual hole for each wire was drilled. The wires and contact were cleaned as described above and the wires inserted in their respective holes and the contact compressed to one-half its original height under a pressure sufficient to form a cold weld. As in the previous example, the wire used non-resistively carried a 30 amp current in an external magnetic field of 10 kilogauss both before and after being spliced. In other tests, niobium-zirconium wires have carried 15 amps in an external magnetic field of 50 kilogauss before and after splicing.

Although it is preferred that the superconductive contact be constructed of the same material as the superconductive component of the wire, this is not essential. The superconductive material used to construct the contact of this invention, however, must have superconductive characteristics, i.e. critical current, which at least match those of the wire so that the superconducting joint will not degrade the current capacity of the spliced wire. Furthermore, the superconductive material used to construct the contact should preferably have thermal expansion characteristics similar to those of the wire so that the wire will not break away from the contact when cooled below its critical temperature into its superconducting region.

What is claimed is:

A superconducting joint for joining ends of superconducting wires which comprises wires of a copper-coated superconducting material having the ends thereof free of said copper coating, a contact member constructed of cold-worked superconducting material and having at least one aperture therein into which the copper coating-free ends of the superconducting wires are positioned, said contact member being compressed sufficiently to lock the superconducting wire ends in place, and a copper shunt electrically connected to and between the copper coating of each wire thereby bypassing said contact member.

References Cited by the Examiner

UNITED STATES PATENTS

| | | | |
|---|---|---|---|
| 3,111,352 | 11/1963 | Theodoseau | 339—30 |
| 3,200,368 | 8/1965 | Stekley et al. | |

FOREIGN PATENTS

| | | |
|---|---|---|
| 574,283 | 12/1945 | Great Britain. |

OTHER REFERENCES

Kolm et al.: High Magnetic Fields, The M.I.T. Press and John Wiley and Sons, Inc., New York 1962, page 335.

LARAMIE E. ASKIN, *Primary Examiner.*

D. L. CLAY, *Assistant Examiner.*